June 16, 1964  R. STANSFIELD  3,137,295
FRESH AIR FACE SEAL
Filed Dec. 27, 1960
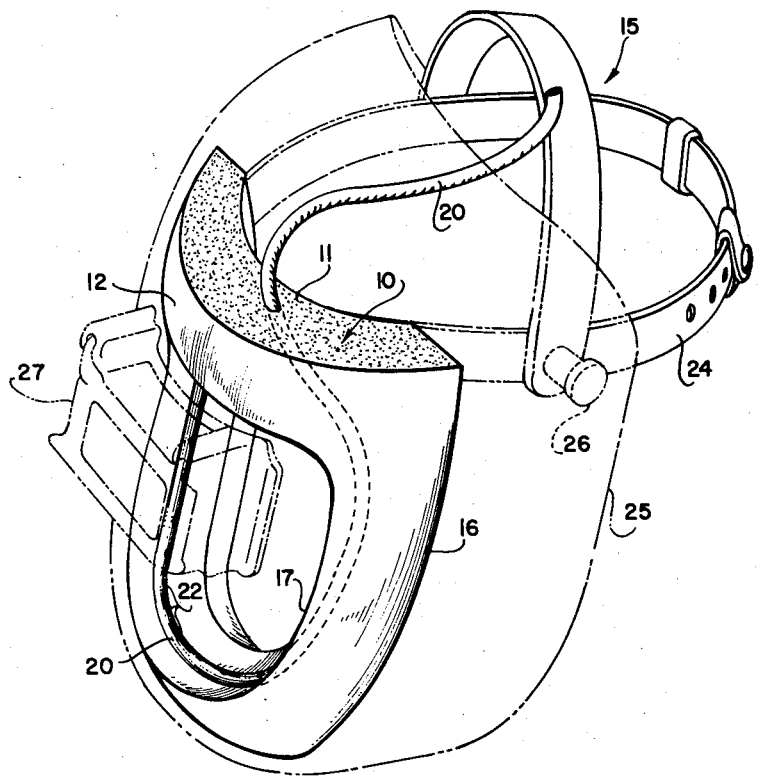
INVENTOR.
ROBERT STANSFIELD
BY
*George C. Sullivan*
Agent

United States Patent Office 3,137,295
Patented June 16, 1964

3,137,295
FRESH AIR FACE SEAL
Robert Stansfield, Panorama City, Calif., assignor to Lockheed Aircraft Corporation, Burbank, Calif.
Filed Dec. 27, 1960, Ser. No. 78,620
1 Claim. (Cl. 128—143)

This invention relates to a fresh air face seal through which fresh air may be conducted to a wearer by means of which toxic or obnoxious fumes may be kept away from the face of the wearer.

In many instances, a person or an animal must come in contact or operate and work in an environment having various gases which are disagreeable and harmful. Such a case exists in a welding operation where toxic or otherwise obnoxious gases are liberated. Protective helmets of the general type now commonly used by welders do not offer complete protection, particularly against gases which may be injurious to the wearer. Most such helmets are designed more particularly to protect the eyes and face of the operator from ultra-violet rays and sparks and molten particles of metal. It is also most desirable that the helmet be so constructed as to protect against toxic gases as well as foreign particles and to provide fresh breathing air.

The metal inert gas (MIG) welding process also known as a consumable electrode welding process, is particularly suited for joining metals which oxidize rapidly at high temperatures, or those on which oxides form during the welding process, which seriously interfere with the soundness and quality of the weld. The more sophisticated metals of present-day usage require the MIG welding process. MIG welding equipment is designed to initiate gas coverage and automatically feed the electrode wire into the weld area when the arc is struck. A welding tool is formed immediately when the arc is established. Welding progress progresses by moving the welding gun along the line of the joint at a rate to build up a bead of the desired dimensions. The consumed electrode wire and the weld tool are protected from oxidation by a shield of inert gases during welding.

Production of the ultra-violet radiation is high in MIG shielded arc welding. A shield of argon gas around the arc in itself doubles the intensity of the ultra-violet radiation generated by the arc. With the greater current densities required, the intensity may be five to thirty times as great as with the more common non-shielded arc welding. As the ultra-violet radiation passes through the air, outside the argon or helium gas shield, it generates ozone from the oxygen present in the outside atmosphere in the ratio of the intensity of the ultra-violet. Metal fumes are also generated in the gas-shielded arc welding processes. Composition of such fumes will depend upon the composition of the materials welded and the impurities they contain. In either event, the metal fumes and the ozone are extremely irritating and dangerous to the person during the welding. Both the welder's lungs and his skin are affected. There is information avialable to indicate that ozone is a lung injurant material, and that exposure to as little as twenty parts per billion parts of air by volume may be lethal within a few hours.

To date, the time which a person could spend in a place where he was welding, such as a welder's booth or the bottom of a ship, would be but about fifteen minutes in an hour. This was in spite of the fact that blowers would be provided for ventilating the compartment. It is obvious that to have four welders standing by to operate one welding device, or to have one welder operate it one-fourth of the time, is quite expensive.

It therefore becomes necessary to provide some means by which the welder may be protected from noxious gases and ultra-violet rays, as well as provide him a sufficient amount of comfort so that he might operate at near 100% of the time. It was found that the common air-line respirator restricted the welder's freedom to the point where his successful accomplishment of his job was difficult to obtain. Efforts have been made to blow the fresh air directly into the welder's helmet, but this served only to draw more noxious gases into the helmet. Ventilation of the work area, if sufficient to remove large quantities of contaminants, is usually strong enough to disrupt the MIG gas shield required for good welding. It has been found that most respirators only protect the breathing system of the individual and not his eyes and other areas of his face. The respirator also restricts his freedom to the point where successful accomplishment of his job is difficult. The noxious gases generated during the MIG welding process and other welding processes have been found to be eye-irritants as well.

It is thus an object of the present invention to provide a face shield through which air is conducted to the eyes, nose and mouth of a wearer. This is provided by the member which surrounds these three sensive organs and a means to pump low pressure fresh air into the space provided by this member.

It is another object of this invention to provide a fresh air face seal which is simple, comfortable, and light weight, so as to provide freedom of movement and operation. The face seal may be attached to the usual welding helmet and it is constructed of a light non-toxic foam or like material. The incoming air hose is very light and no exhaling valves need be provided.

It is another object of the present invention to provide a face seal to conduct fresh air to the face of a wearer which provides ventilation at the approximate points of contact of the seal on the face of the wearer. The fresh air is ducted to the face around the eyes, nose and mouth and escapes around the periphery of the seal next to the face with a sufficient differential pressure inside and out to keep the surrounding toxic gases out.

The figure shows the face seal in combination with the usual welder's helmet. The seal 10 is a foam material of light weight with slightly resilient qualities to conform to the face of the wearer.

The seal 10 will be glued or otherwise fastened to the backside of the shield 25 in an air-tight relationship. It will be worn in a loose fashion so that the incoming fresh air and the exhaled air may be vented around the backside 11 of seal 10, providing ventilation for the areas of the face of the wearer which come in contact with the backside 11. This feature provides the adidtional advantage of simplicity.

It is conceivable that shield 25 might be eliminated in some situations where flying debris and ultra-violet rays are not a a danger. The air pressure in the space defined by the inner periphery 17 is sufficient to keep out mildly innocuous fumes. Seal 10 would be held against the face of the wearer by a simple strap system.

The welder's helmet 15 shown here has a strap system 24 to which the shield 25 is hinged at pivots 26. The shield 25 extends behind the outer periphery 16 of seal 10 and encloses the front side 12 over the opening defined by the inner periphery 17. A transparent eye-piece 27 may be provided so that the wearer may see out of the helmet. In cases where a great amount of ultra-violet rays are being put off, as in a welding operation, this eye-piece will include ultra-violet filtering material to prevent injury from the rays to the eyes of the wearer. In cases where the ultra-violet rays are not so prevalent, the glass may be relatively transparent.

While the fresh air through tube 20 and the apertures 22 provide a great deal of ventilation to the wearer, in some instances it may be desirable to eliminate as much of the shield 25 as possible. In those instances, the shield will be reduced in size so as to cover only the seal 10 itself. This has been found to be quite comfortable and very lightweight.

While the seal, according to the present invention, has ben shown as applied to a welder's helmet and used by human beings, it may be so adapted in shape to fit the face of any air breathing creature which must be in a noxious environment. It is not desired to limit the invention to the use in a welding operation since it is advantageous in any environment where the wearer must have a supply of fresh air and protection against the gases which surround him. An efficient lightweight protective face seal with a fresh air supply means has ben disclosed. Having disclosed the details of my invention, I claim the following combinations and their equivalents as my invention.

I claim:

A face protector with a fresh air face seal, comprising: a resilient foam member completely surrounding the face of the wearer, the member having a backside contoured to substantially fit the face of a wearer, a front side which has an arcuate curve about a vertical axis, a continuous outer periphery and a continuous inner periphery, the inner periphery of the member defining an opening in the member betwen the front and backsides; tubing embedded in said member immediately adjacent the surface of the inner periphery and surrounding the opening, said tubing having a plurality of inwardly directed apertures; means to conduct fresh air to the tubing so that it will be available to the wearer for breathing; a tough, opaque protective shield into which the seal is fitted, said shield engaging the front side of the seal and extending beyond the outer periphery thereof to protect the wearer from flying debris, said shield closing the seal opening in a substantially air-tight relationship with the front side of the seal member; a substantially transparent means mounted on the shield in line with the opening in the seal member to enable the wearer to see; and means to hold the member against the face of the wearer in a loose relationship so that air may be exhaled by the wearer around the backside of the member.

References Cited in the file of this patent

UNITED STATES PATENTS

| 2,469,273 | Parker | May 3, 1949 |
| 2,665,686 | Wood | Jan. 12, 1954 |

FOREIGN PATENTS

| 585,885 | Great Britain | Feb. 27, 1947 |